US010917578B2

(12) United States Patent
Ku et al.

(10) Patent No.: US 10,917,578 B2
(45) Date of Patent: Feb. 9, 2021

(54) CAMERA TILTING MECHANISM FOR DISPLAYS WITH CORNER CHAMFERS

(71) Applicant: Intel Corporation, Santa Clara, CA (US)

(72) Inventors: Jeff Ku, Taipei (TW); Tom Chen, Taipei (TW); Vincent Hung, Taipei (TW)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/405,676

(22) Filed: May 7, 2019

(65) Prior Publication Data

US 2019/0273872 A1   Sep. 5, 2019

(51) Int. Cl.
*H04N 5/232* (2006.01)
*H04N 5/225* (2006.01)

(52) U.S. Cl.
CPC ....... *H04N 5/23299* (2018.08); *H04N 5/2257* (2013.01); *H04N 5/23216* (2013.01); *H04N 5/23227* (2018.08); *H04N 5/23296* (2013.01); *H04N 5/232935* (2018.08)

(58) Field of Classification Search
CPC .................. H04N 5/23299; H04N 5/2257
See application file for complete search history.

(56) References Cited

U.S. PATENT DOCUMENTS

| 2008/0064437 | A1* | 3/2008 | Chambers | ......... H04N 1/00307 455/556.1 |
| 2010/0164920 | A1* | 7/2010 | Shimoharada | ......... H04N 7/142 345/207 |
| 2017/0026634 | A1* | 1/2017 | Mirlay | ................ H04N 13/296 |

* cited by examiner

*Primary Examiner* — Christopher K Peterson
(74) *Attorney, Agent, or Firm* — Schwabe, Williamson & Wyatt, P.C.

(57) ABSTRACT

System and method for enabling capturing of multiple images from a display device in which multiple image capturing devices disposed, at least partially, in the display device are controllably oriented to capture opposing offset views of a subject for combining (e.g., via optical tiling of captured image data) into a composite view.

20 Claims, 4 Drawing Sheets

CAMERA TILTING MECHANISM FOR DISPLAYS WITH CORNER CHAMFERS

BACKGROUND

The present disclosure relates to image capture devices integrated in mobile computing systems, and in particular, to cameras disposed within the bezel of a tilt-up display screen of a personal computer (PC).

A PC is versatile for many and varied applications beyond the typical computing functions for which it was originally designed. One such application is enabling communications via video conferencing in which an image (e.g., "headshot") of the local user is captured by a camera within the bezel of the tilt-up display screen of a mobile PC and exchanged with that of the person with whom the local user is communicating. Prior conventional techniques placed a camera within the center of the top portion of the display bezel surrounding the outer boundary of the display screen, thereby ensuring capture of a more desirable facial image of the local user.

However, as displays have increased in size, it remains desirable to minimize form factors of the host mobile systems. As a result, larger displays have been accommodated by narrowing bezels to achieve higher screen-to-body ratios (e.g., ≥80% for displays of 12-13 inches and ≥90% for displays larger than 14 inches).

Initially this has required size reductions of the camera lenses, which degrades camera performance, and/or size reductions of camera the modules, which further degrades camera performance, feature set and imaging quality while also potentially increasing cost due to specialized manufacturing processes. However, even with such reductions in camera sizes, accommodations have further required displays with either housing extensions or "bump outs" to locate the cameras. Other alternatives include cameras placed below the display (e.g., in the bezel below the display or placed below the display on the surface of the case containing the keyboard), which produce undesirable field-of-view (FoV) images (e.g., images from below the chin of the local user).

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
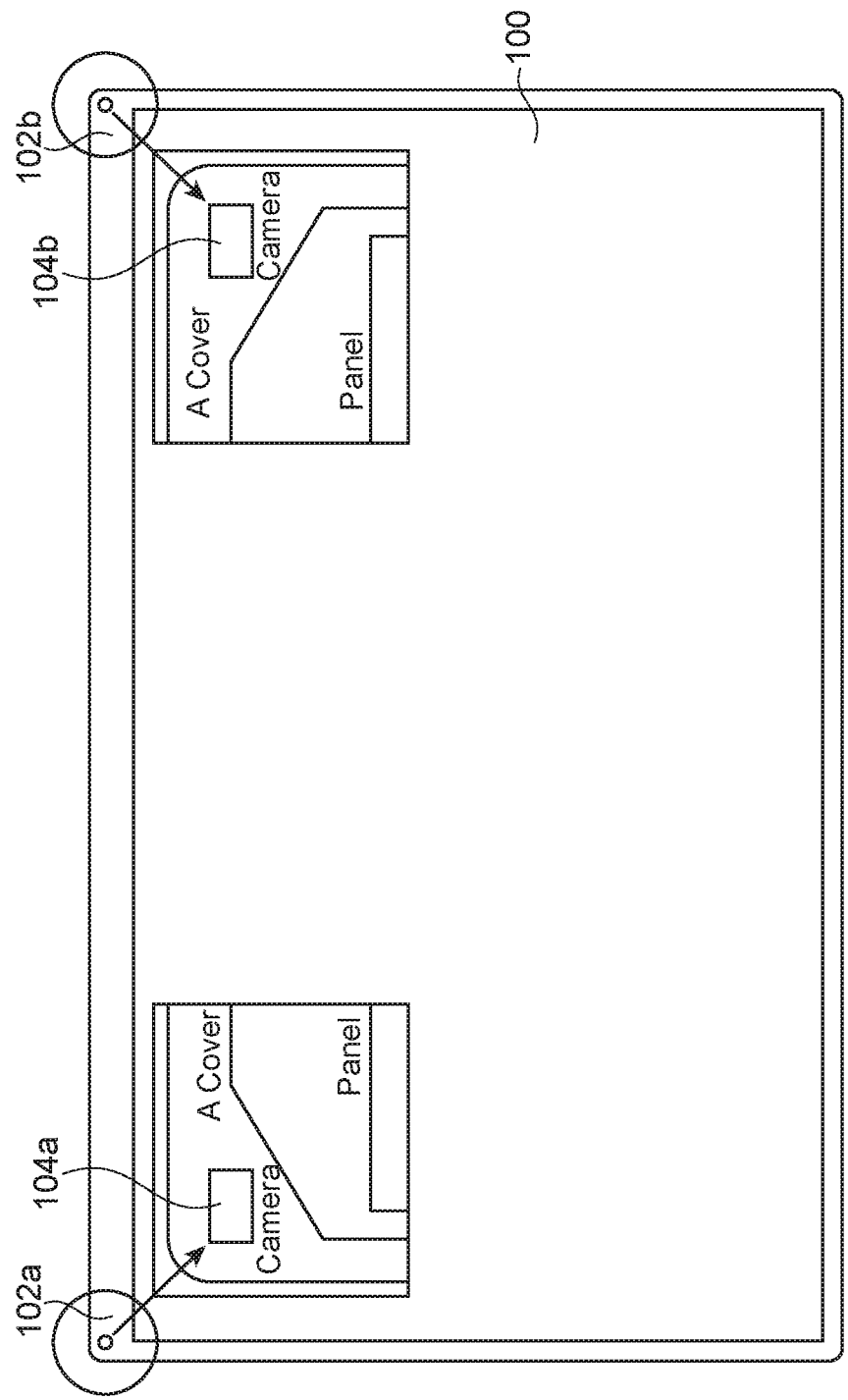
FIG. 1 illustrates a video display including multiple image capturing devices according to example embodiments.

FIG. 1 illustrates a video display including multiple image capturing devices according to example embodiments. As noted above, to increase the screen-to-body ratio, display suppliers provide PC displays 100 with corner chamfers 102a, 102b cut to hold user facing camera modules 104a, 104b without needing to create recessed display features (e.g., such as a notch in the top of the display area as done in selected smartphones).

Figure 2:
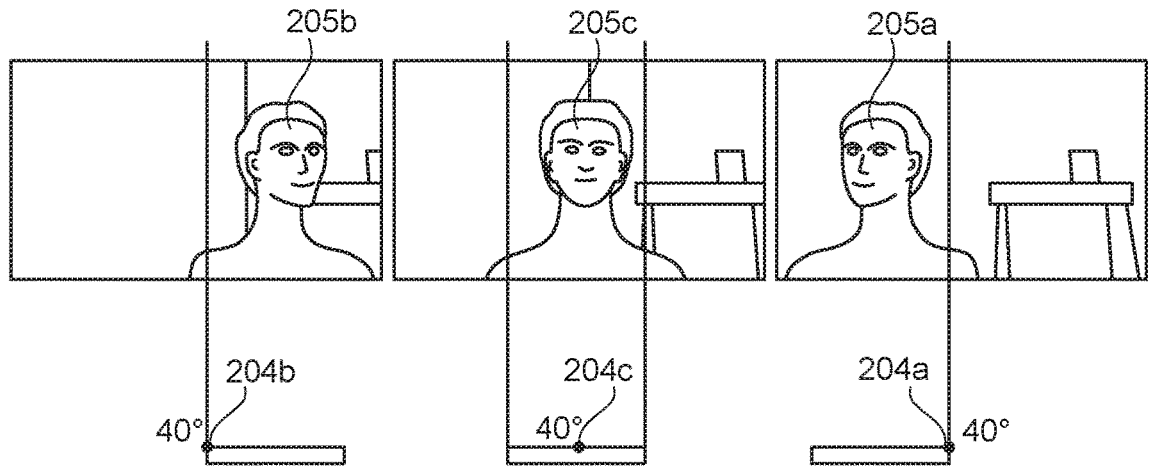
FIG. 2 illustrates captured images of a user using image capturing devices in conventional top-center and corner locations.

FIG. 2 illustrates captured images of a user using image capturing devices in conventional top-center and corner locations. A problem results, however, with the user facing camera placed at the corner. Previously, with a camera 204c located above the top center of the display (e.g., with a field of view (FoV) of 40 degrees), a fully frontal image 205c of the user is captured and centered in the display. However, with cameras 204a, 204b located in the corners, the captured images 205a, 205b are only partially frontal and partially profile, and also appear off-center at either end of the display.

Figure 3:
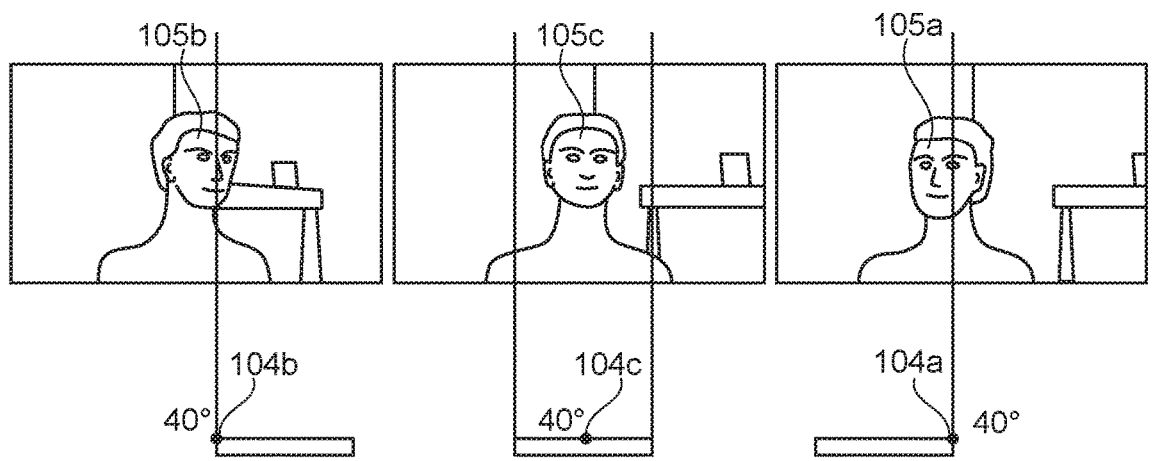
FIG. 3 illustrates captured images of a user using image capturing devices according to example embodiments.

FIG. 3 illustrates captured images of a user using image capturing devices according to example embodiments. As discussed in more detail below, multiple image capturing devices (e.g., compact camera modules employing wafer level device technology as widely known in the art) 104a, 104b are disposed at opposing upper portions (e.g., top corners) of the display 100 and positioned such that each captures, from its perspective, a partial frontal and partial profile image 105a, 105b (each of which may remain centered within the captured display frame as shown). The resulting captured image data may then be processed in accordance with one or more of various image tiling techniques widely known in the art that enable creation of image data that, in turn, may be presented as a fully frontal image 105c which may be similar to an image otherwise produced from an image capturing device 104c positioned in a conventional top center location of the display 100.

Figure 4A:
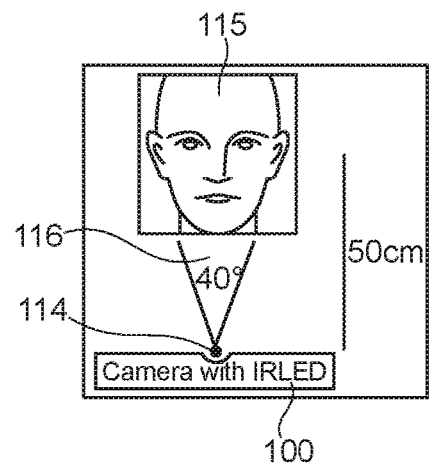
FIGS. 4A-4B illustrate differences between a captured image of a user using an image capturing device in a conventional top-center location and captured image elements of a user using multiple image capturing devices according to example embodiments.
Figure 4B:
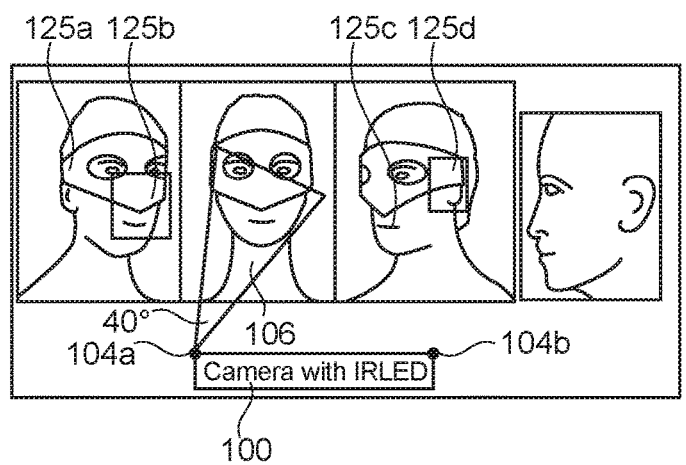

FIGS. 4A-4B illustrate differences between a captured image of a user using an image capturing device in a conventional top-center location and captured image elements of a user using multiple image capturing devices according to example embodiments. As noted above, a conventionally located camera 114 in the top center of the display 100 produces a full frontal image 115. As further noted above, multiple separated cameras 104a, 104b (e.g., located and positioned at inwardly directed angles during operation at opposing extremes of the display 100) capture virtually all features of the subject 106 to be displayed, by locating various views of the ear regions 125a, 125d, nose 125b, mouth 125c, etc., of the user 106. Using such captured features as reference points, tiling of the image data may be performed to produce a composite image of the user 106 to appear on the display 100 as if a single camera had been used.

Figure 5A:
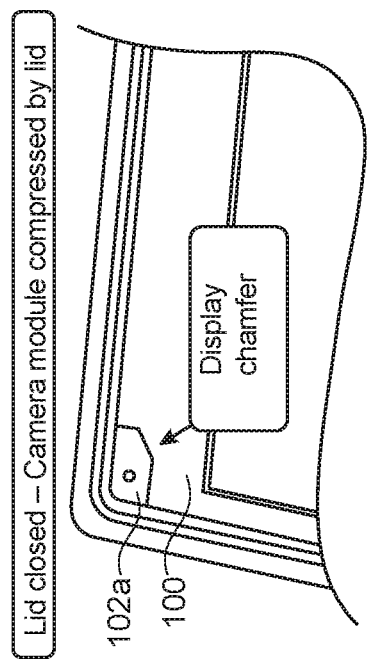
FIGS. 5A-5B illustrate placement and orientation of an image capturing device in a display when not enabled for use according to example embodiments.
Figure 5B:
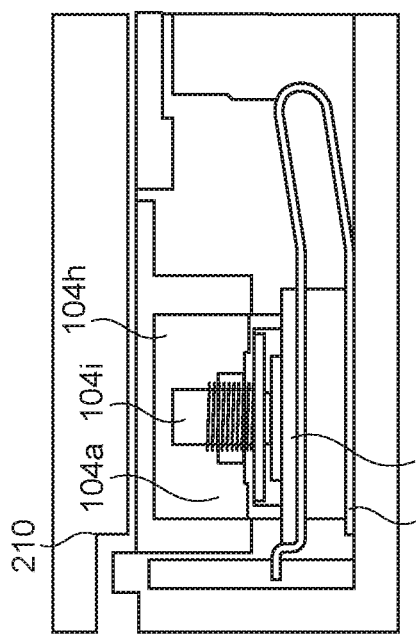

FIGS. 5A-5B illustrate placement and orientation of an image capturing device in a display when not enabled for use according to example embodiments. For example, while the display 100 is in its closed position, e.g., with the viewing surface of the display 100 substantially flush against the keyboard housing 210 of the host PC, the camera module is, similarly, in its closed (e.g., latched, locked or otherwise restrained) position such that its viewing surface, i.e., the surface of the housing 104h via which images may be viewed through its lens assembly 104i is flush, or aligned with, the viewing surface of the display 100. In accordance with example embodiments, this may preload compression of a spring mechanism 106 that would otherwise urge rotation of the camera module 104h outward from the viewing surface of the display 100 (discussed in more detail below).

Figure 6A:
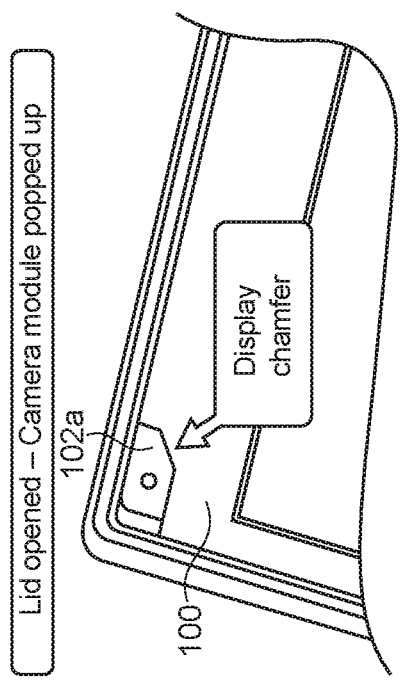
FIGS. 6A-6B illustrate placement and orientation of an image capturing device in a display when enabled for use according to example embodiments.
Figure 6B:
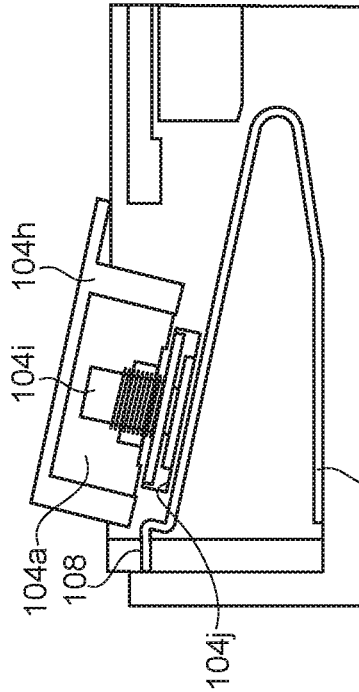

FIGS. 6A-6B illustrate placement and orientation of an image capturing device in a display when enabled for use according to example embodiments. For example, camera deployment (e.g., to its open, unlatched, unlocked, released or otherwise unrestrained position) and operation may be enabled simply by opening the display, e.g., by rotating it away from the keyboard housing 210 of the host PC. As a result, the preloaded compression of the spring mechanism 106 may urge rotation of the camera module 104h outward from the viewing surface of the display 100 (e.g., until it engages at a predetermined angle with a rotation stopping mechanism 108). Further, during this deployment of the camera module 104h, the operation of the camera for image capturing and processing purposes may be enabled by electronic circuitry sensitive to the movement of the camera module 104h from its closed, or flush, position to its deployed, or angularly protruding, position.

In accordance with well known electronic camera operation principles, visual information is captured for processing via electronic circuitry 104j of the camera module. The electronic circuitry 104j may be there, or, alternatively in other processing circuitry (discussed in more detail below), that the image tiling may be performed.

Other mechanisms may also be used to cause or allow angular movement of the camera module 104h for deployment of the camera during its operation. For example, a push-push spring loaded mechanism may be used as a latching mechanism, e.g., similar to those used for inserting and removing external memory modules (e.g., SD or micro-SD memory cards) in a PC. The user may manually push the camera into its flush orientation causing a locking mechanism to engage (e.g., latch, lock or otherwise restrain and orient the camera module 104h) to maintain the flush orientation and, optionally, cause operation of the camera module to be disabled. Conversely, when camera operation is desired, the user may again manually push the camera to cause release of the latching, locking or orientation mechanism and thereby allow the spring mechanism 106 urge the camera angularly outward and cause operation of the camera module to be enabled. Other mechanisms may also be employed, such as remote control of electromagnetic mechanisms to depress and deploy the camera module into and out from the display surface, respectively, while also disabling and enabling camera operation.

Figure 7:
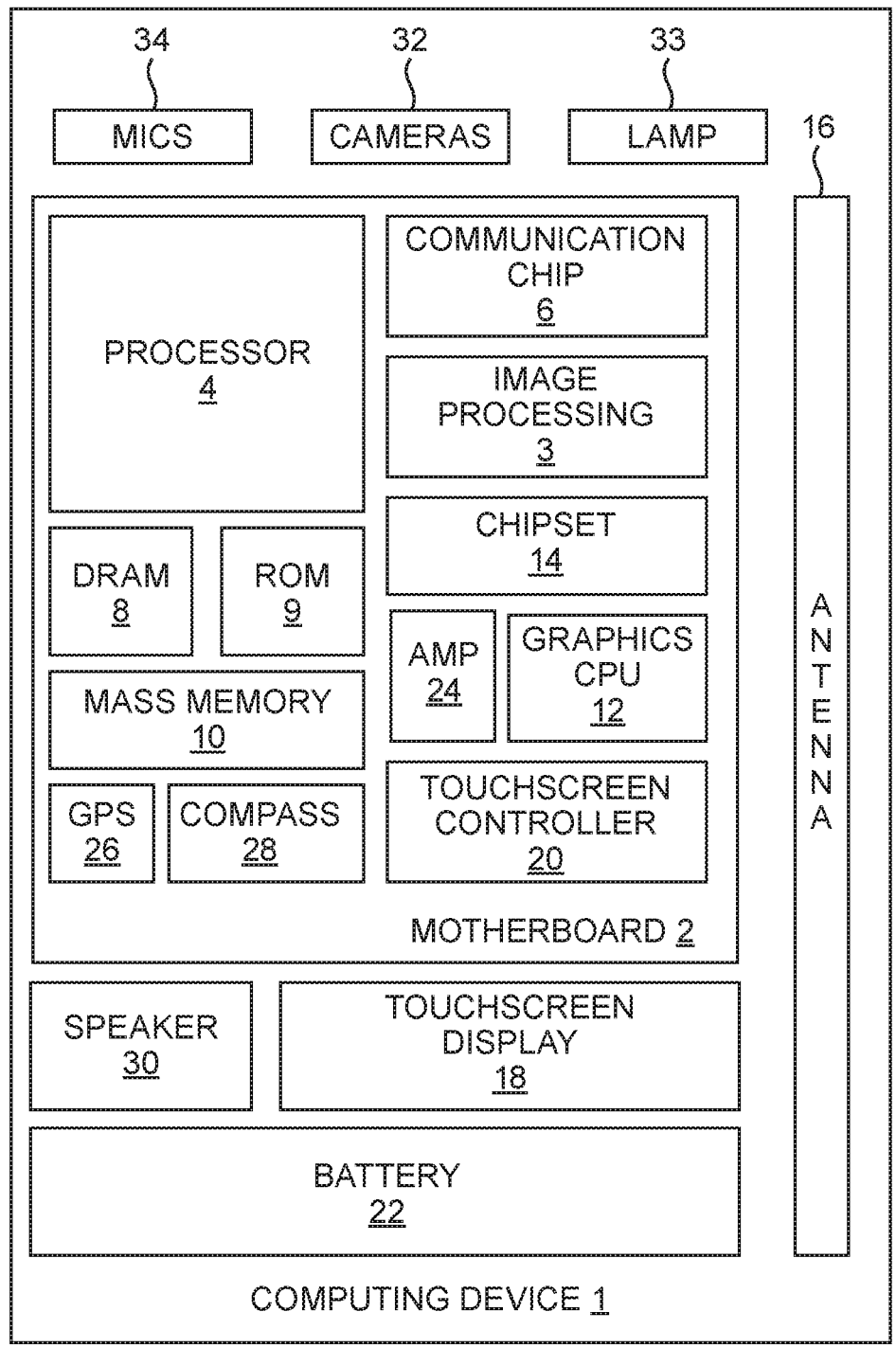
FIG. 7 illustrates a block diagram of a mobile computing device including image capturing devices according to example embodiments.

FIG. 7 illustrates a block diagram of a mobile computing device 1 including image capturing devices according to example embodiments. The computing device 1 may house a system board 2 that may include a number of components, including, without limitation, to a processor 4 and at least one communication package 6. The communication package 6 may be coupled to one or more antennas 16. The processor 4 may be physically as well as electrically coupled to the board 2.

Depending on its applications, computing device 1 may include other components that may or may not be physically and electrically coupled to the board 2. These other components include, without limitation, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 (e.g., a touchscreen), a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, image capturing devices (e.g., cameras) 32, a lamp 33, a microphone array 34, and a mass storage device (such as a hard disk drive) 10, compact disk (CD) drive (not shown), digital versatile disk (DVD) drive (not shown), and so forth. These components may be connected to the system board 2, mounted to the system board, or combined with any of the other components.

The communication package 6 enables wireless and/or wired communications for the transfer of data to and from the computing device 1. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 1 may include multiple communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

The cameras 32 may contain image sensors with pixels or photodetectors, and may use resources of an image processing chip 3 to read values and also to perform exposure control, depth map determination, format conversion, coding and decoding, noise reduction and 3D mapping, etc. The processor 4 is coupled to the image processing chip to drive the processes, set parameters, etc.

In various implementations, the computing device 1 may be eyewear, a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, a digital video recorder, wearables or drones. The computing device may be fixed, portable, or wearable. In further implementations, the computing device 1 may be any other electronic device that processes data. Embodiments may be further implemented as a part of one or more memory chips, controllers, CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the foregoing and following description and the following claims, the term "coupled" along with its derivatives, may be used. "Coupled" is used to indicate that two or more elements cooperate or interact with each other, but they may or may not have intervening physical or electrical components between them.

As used in the claims, unless otherwise specified, the use of the ordinal adjectives "first", "second", "third", etc., to describe a similar element, merely indicate that different instances of such elements are being recited, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of operation described herein may be changed and are not limited to the manner described herein. Moreover, actions of any operation flow need not be implemented in the order described, nor do all actions necessarily need to be performed. Also, those actions that are not dependent on other actions may be performed in parallel with the other actions.

Method examples described herein may be implemented, at least in part, with nor or more machines or computing devices. Some examples may include a computer-readable medium or machine-readable medium encoded with instructions operable to configure an electronic device to perform methods as described in the examples disclosed herein. An example implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, without limitation, hard disks, removable magnetic disks, removable optical disks (e.g., compact disks and digital video disks), magnetic cassettes, memory cards or sticks, random access memory (RAM), read only memory (ROM), and the like.

The following examples pertain to further embodiments. The various features of the different embodiments may be variously combined with some features included and others excluded to suit a variety of different applications.

Some embodiments pertain to a display having multiple image capturing devices, including a display device having a viewing surface and edge with opposing first and second top corner regions, and a plurality of image capturing devices disposed, at least partially, in the opposing first and second top corner regions. The plurality of image capturing devices includes first and second image capturing devices. The first image capturing device has a first angular field of view centered about a first axis, and is configured to be selectively positioned in: a first orientation such that the first axis defines a first angle relative to the viewing surface; or a first alternative orientation such that the first axis defines a first alternative angle relative to the viewing surface and unequal to the first angle. The second image capturing device has a second angular field of view centered about a second axis, and is configured to be selectively positioned in: a second orientation such that the second axis defines a second angle relative to the viewing surface; or a second alternative orientation such that the second axis defines a second alternative angle relative to the viewing surface and unequal to the second angle.

In further embodiments, the first and second alternative angles include first and second acute angles generally oriented toward an area intermediate the opposing first and second top corner regions.

In further embodiments, the first and second axes intersect when the first and second image capturing devices are positioned in the first and second alternative orientations, respectively.

In further embodiments, the first alternative angle is less than the first angle, and the second alternative angle is less than the second angle.

In further embodiments, further included is a plurality of latching mechanisms disposed, at least partially, in the opposing first and second top corner regions, and including: a first latching mechanism to control the first image capturing device with a first closed latching state for the first orientation, and a first open latching state for the first alternative orientation; and a second latching mechanism to control the second image capturing device with a second closed latching state for the second orientation, and a second open latching state for the second alternative orientation.

In further embodiments, further included is a plurality of orientation control devices disposed, at least partially, in the opposing first and second top corner regions, and including: a first orientation control device to control the first image capturing device with a first closed orientation state for the first orientation, and a first open orientation state for the first alternative orientation; and a second orientation control device to control the second image capturing device with a second closed orientation state for the second orientation, and a second open orientation state for the second alternative orientation.

In further embodiments, further included is a portable computer with a keyboard housing to which the display device is rotatably coupled. The display device is rotatable to a closed position against the keyboard housing for the first and second orientations, and rotatable to an open position away from the keyboard housing for the first and second alternative orientations.

Some embodiments pertain to a display having multiple image capturing devices, including display means having a viewing surface and edge with opposing first and second top corner regions, and a plurality of image capturing means disposed, at least partially, in the opposing first and second top corner regions. The plurality of image capturing means includes first and second image capturing means. The first image capturing means has a first angular field of view centered about a first axis, and is configured to be selectively positioned in: a first inactive orientation such that the first axis defines a first angle relative to the viewing surface; or a first alternative orientation such that the first axis defines a first alternative angle relative to the viewing surface and unequal to the first angle. The second image capturing means has a second angular field of view centered about a second axis, and is configured to be selectively positioned in: a second orientation such that the second axis defines a second angle relative to the viewing surface; or a second alternative orientation such that the second axis defines a second alternative angle relative to the viewing surface and unequal to from the second angle.

In further embodiments, the first and second alternative angles include first and second acute angles generally oriented toward an area intermediate the opposing first and second top corner regions.

In further embodiments, the first and second axes intersect when the first and second image capturing devices are positioned in the first and second alternative orientations, respectively.

In further embodiments, the first alternative angle is less than the first angle, and the second alternative angle is less than the second angle.

In further embodiments, further included is a plurality of latching means disposed, at least partially, in the opposing first and second top corner regions, and including: first latching means for controlling the first image capturing means with a first closed latching state for the first orientation, and a first open latching state for the first alternative orientation; and second latching means for controlling the second image capturing means with a second closed latching state for the second orientation, and a second open latching state for the second alternative orientation.

In further embodiments, further included is a plurality of orientation control means disposed, at least partially, in the opposing first and second top corner regions, and including: first orientation control means for controlling the first image capturing means with a first closed orientation state for the first orientation, and a first open orientation state for the first alternative orientation; and second orientation control means for controlling the second image capturing means with a second closed orientation state for the second orientation, and a second open orientation state for the second alternative orientation.

In further embodiments, further included is a portable computer with a keyboard housing to which the display means is rotatably coupled. The display means is rotatable to a closed position against the keyboard housing for the first and second orientations, and rotatable to an open position away from the keyboard housing for the first and second alternative orientations.

Some embodiments pertain a method for enabling capturing of multiple images from a display device, including using a display device that includes a viewing surface and edge with opposing first and second top corner regions, and a plurality of image capturing devices disposed, at least partially, in the opposing first and second top corner regions. The plurality of image capturing devices includes first and second image capturing devices. The first image capturing device has a first angular field of view centered about a first axis, and the second image capturing device has a second angular field of view centered about a second axis. Further included, for a first time interval, is causing the first image capturing device to be positioned in a first orientation such that the first axis defines a first angle relative to the viewing surface, and the second image capturing device to be positioned in a second orientation such that the second axis defines a second angle relative to the viewing surface. Further included, for a second time interval, is causing the first image capturing device to be positioned in a first alternative orientation such that the first axis defines a first alternative angle relative to the viewing surface and unequal to the first angle, and the second image capturing device to be positioned in a second alternative orientation such that the second axis defines a second alternative angle relative to the viewing surface and unequal to from the second angle.

In further embodiments, the first and second alternative angles include first and second acute angles generally oriented toward an area intermediate the opposing first and second top corner regions.

In further embodiments, the first and second axes intersect when the first and second image capturing devices are positioned in the first and second alternative orientations, respectively.

In further embodiments, the first alternative angle is less than the first angle, and the second alternative angle is less than the second angle.

In further embodiments, further included is: actuating a first latching mechanism to cause the first image capturing device to be in a first closed latching state for the first orientation, and in a first open latching state for the first alternative orientation; and actuating a second latching mechanism to cause the second image capturing device to be in a second closed latching state for the second orientation, and in a second open latching state for the second alternative orientation.

In further embodiments, further included is: operating a first orientation control to cause the first image capturing device to be in a first closed orientation state for the first orientation, and in a first open orientation state for the first alternative orientation; and operating a second orientation control to cause the second image capturing device to be in a second closed orientation state for the second orientation, and in a second open orientation state for the second alternative orientation.

In further embodiments, further including rotating the display device relative to a keyboard housing of a portable computer to: a closed position against the keyboard housing for the first and second orientations; and an open position away from the keyboard housing for the first and second alternative orientations.

The above description illustrates various embodiments of the present disclosure along with examples of how aspects of the particular embodiments may be implemented. The above examples should not be deemed to be the only embodiments and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. An apparatus including a display having multiple image capturing devices, comprising:
   a display device having a viewing surface and edge with opposing first and second top corner regions; and
   a plurality of image capturing devices disposed, at least partially, in said opposing first and second top corner regions, and including a first image capturing device having a first angular field of view centered about a first axis, and configured to be selectively positioned in
   a first disposition where the first image capturing device is restrained below the viewing surface of the display device, and said first axis defines a first angle relative to said viewing surface, or
   a first alternative disposition wherein the first image capturing device is unrestrained and deployed above the viewing surface of the display device in a tilted manner in a direction orthogonal to the viewing surface of the display device, and said first axis defines a first alternative angle relative to said viewing surface and unequal to said first angle, and
a second image capturing device having a second angular field of view centered about a second axis, and configured to be selectively positioned in
   a second disposition where the second image capturing device is restrained below the viewing surface of the display device, and said second axis defines a second angle relative to said viewing surface, or
   a second alternative disposition where the second image capturing device is unrestrained and deployed above the viewing surface of the display device in a tilted manner in a direction orthogonal to the viewing surface of the display device, and said second axis defines a second alternative angle relative to said viewing surface and unequal to said second angle.

2. The apparatus of claim 1, wherein said first and second alternative angles comprise first and second acute angles generally oriented toward an area intermediate said opposing first and second top corner regions.

3. The apparatus of claim 1, wherein said first and second axes intersect when said first and second image capturing devices are positioned in said first and second alternative dispositions, respectively.

4. The apparatus of claim 1, wherein:
said first alternative angle is less than said first angle; and
said second alternative angle is less than said second angle.

5. The apparatus of claim 1, further comprising a plurality of latching mechanisms disposed, at least partially, in said opposing first and second top corner regions, and including:
   a first latching mechanism to control said first image capturing device with
      a first closed latching state for said first disposition, and
      a first open latching state for said first alternative disposition; and
   a second latching mechanism to control said second image capturing device with
      a second closed latching state for said second disposition, and
      a second open latching state for said second alternative disposition.

6. The apparatus of claim 1, further comprising a plurality of disposition control devices disposed, at least partially, in said opposing first and second top corner regions, and including:
   a first disposition control device to control said first image capturing device with
      a first closed disposition state for said first disposition, and
      a first open disposition state for said first alternative disposition; and
   a second disposition control device to control said second image capturing device with
      a second closed disposition state for said second disposition, and
      a second open disposition state for said second alternative disposition.

7. The apparatus of claim 1, wherein:
said apparatus comprises a portable computer including a keyboard housing to which said display device is rotatably coupled;
said display device is rotatable to a closed position against said keyboard housing for said first and second dispositions; and
said display device is rotatable to an open position away from said keyboard housing for said first and second alternative dispositions.

8. An apparatus including a display having multiple image capturing devices, comprising:
   a display device having a viewing surface and edge with opposing first and second top corner regions;
   a keyboard housing, having a keyboard, coupled to the display device, the display device and the keyboard housing being rotatable relative to each other between an open position and a closed position; and
   a plurality of image capturing devices disposed, at least partially, in said opposing first and second top corner regions, and including
   a first image capturing device having a first angular field of view centered about a first axis, and configured to be selectively positioned in
      a first disposition where the first image capturing device is restrained below the viewing surface of the display device, and said first axis defines a first angle relative to said viewing surface, when the display device and the keyboard housing are in the closed position relative to each other, or
      a first alternative disposition where the first image capturing device is unrestrained and deployed above the viewing surface of the display device in a tilted manner in a direction orthogonal to the viewing surface of the display device, and said first axis defines a first alternative angle relative to said viewing surface and unequal to said first angle, when the display device and the keyboard housing are in the open position relative to each other, and
   a second image capturing device having a second angular field of view centered about a second axis, and configured to be selectively positioned in
      a second disposition where the second image capturing device is restrained below the viewing surface of the display device, and said second axis defines a second angle relative to said viewing surface, when the display device and the keyboard housing are in the closed position relative to each other, or
      a second alternative disposition where the second image capturing device is unrestrained and deployed above the viewing surface of the display device in a tilted manner in a direction orthogonal to the viewing surface of the display device, and said second axis defines a second alternative angle relative to said viewing surface and unequal to said second angle, when the display device and the keyboard housing are in the open position relative to each other.

9. The apparatus of claim 8, wherein said first and second alternative angles comprise first and second acute angles generally oriented toward an area intermediate said opposing first and second top corner regions.

10. The apparatus of claim 8, wherein said first and second axes intersect when said first and second image capturing devices are positioned in said first and second alternative dispositions, respectively.

11. The apparatus of claim 8, wherein:
said first alternative angle is less than said first angle; and
said second alternative angle is less than said second angle.

12. The apparatus of claim 8, further comprising a plurality of latching mechanism disposed, at least partially, in said opposing first and second top corner regions, and including:
first latching mechanism for controlling said first image capturing device with
a first closed latching state for said first disposition, and
a first open latching state for said first alternative disposition; and
second latching mechanism for controlling said second image capturing device with
a second closed latching state for said second disposition, and
a second open latching state for said second alternative disposition.

13. The apparatus of claim 8, further comprising a plurality of disposition control devices disposed, at least partially, in said opposing first and second top corner regions, and including:
a first disposition control device for controlling said first image capturing device with
a first closed disposition state for said first disposition, and
a first open disposition state for said first alternative disposition; and
a second disposition control device for controlling said second image capturing device with
a second closed disposition state for said second disposition, and
a second open disposition state for said second alternative disposition.

14. A method for enabling capturing of multiple images from a display device, comprising:
using a display device that includes
a viewing surface and edge with opposing first and second top corner regions, and
a plurality of image capturing devices disposed, at least partially, in said opposing first and second top corner regions, and including
a first image capturing device having a first angular field of view centered about a first axis, and
a second image capturing device having a second angular field of view centered about a second axis;
for a first time interval, causing
said first image capturing device to be positioned in a first disposition where the first image capturing device is restrained below the viewing surface of the display device, and said first axis defines a first angle relative to said viewing surface, and
said second image capturing device to be positioned in a second disposition where the second image capturing device is restrained below the viewing surface of the display device, and said second axis defines a second angle relative to said viewing surface; and
for a second time interval, causing
said first image capturing device to be positioned in a first alternative disposition where the first image capturing device is unrestrained and deployed in a tilted manner in a direction orthogonal to the viewing surface of the display device, and said first axis defines a first alternative angle relative to said viewing surface and unequal to said first angle, and
said second image capturing device to be positioned in a second alternative disposition where the second image capturing device is unrestrained and deployed in a tilted manner in a direction orthogonal to the viewing surface of the display device, and said second axis defines a second alternative angle relative to said viewing surface and unequal to said second angle.

15. The method of claim 14, wherein said first and second alternative angles comprise first and second acute angles generally oriented toward an area intermediate said opposing first and second top corner regions.

16. The method of claim 14, wherein said first and second axes intersect when said first and second image capturing devices are positioned in said first and second alternative dispositions, respectively.

17. The method of claim 14, wherein:
said first alternative angle is less than said first angle; and
said second alternative angle is less than said second angle.

18. The method of claim 14, further comprising:
actuating a first latching mechanism to cause said first image capturing device to be
in a first closed latching state for said first disposition, and
in a first open latching state for said first alternative disposition; and
actuating a second latching mechanism to cause said second image capturing device to be
in a second closed latching state for said second disposition, and
in a second open latching state for said second alternative disposition.

19. The method of claim 14, further comprising:
operating a first disposition control to cause said first image capturing device to be
in a first closed disposition state for said first disposition, and
in a first open disposition state for said first alternative disposition; and
operating a second disposition control to cause said second image capturing device to be
in a second closed disposition state for said second disposition, and
in a second open disposition state for said second alternative disposition.

20. The method of claim 14, further comprising rotating said display device relative to a keyboard housing of a portable computer to:
a closed position against said keyboard housing for said first and second dispositions; and
an open position away from said keyboard housing for said first and second alternative dispositions.

* * * * *